United States Patent [19]

Marek

[11] 4,202,127
[45] May 13, 1980

[54] NOISE MAKING LURE

[76] Inventor: Larry L. Marek, 444 Benson, N.E., Grand Rapids, Mich. 49503

[21] Appl. No.: 797,049

[22] Filed: May 16, 1977

[51] Int. Cl.² ............................................. A01K 86/01
[52] U.S. Cl. ................................. 43/42.31; 43/42.11; 43/42.18
[58] Field of Search ................. 43/42.31, 42.32, 42.11, 43/42.18, 42.13

[56] References Cited

U.S. PATENT DOCUMENTS

| | | | |
|---|---|---|---|
| 1,522,019 | 1/1925 | Mantz | 43/42.11 |
| 1,830,080 | 11/1931 | Allen | 43/42.11 |
| 1,852,620 | 4/1932 | Martin | 43/42.5 |
| 1,997,802 | 4/1935 | Meyer | 43/42 |
| 2,124,152 | 7/1938 | Salm | 43/42.5 |
| 2,547,240 | 10/1946 | Sedivy | 43/42.5 |
| 2,765,570 | 4/1951 | Young et al. | 43/42.5 |
| 3,673,727 | 7/1972 | Bauer | 43/42.5 |
| 3,771,251 | 11/1973 | Stamy | 43/42.32 |
| 3,898,757 | 8/1975 | Gentert | 43/42.5 |

Primary Examiner—William Pieprz
Attorney, Agent, or Firm—John A. Waters

[57] ABSTRACT

A fishing lure having two bodies connected together such that the bodies rattle against each other as the lure moves through water. Each body comprises a metal plate bent to form a front portion and a back portion. The back portion has a longitudinal bend so that each side of the back portion extends slightly downwardly to the side edge thereof. The front portion is bent upwardly with respect to the back portion. The front portion has a longitudinal bend wherein each side extends upwardly to the side edge thereof. The front and rear portions of each metal plate have conforming shapes so that the top plate nests in the bottom plate. The front portion of the top plate is bent at a greater upward angle with respect to its rear portion than the upward angle of the bend of the front portion of the bottom plate with respect to its rear portion. Holes extend through each end of each plate. A front metal ring extends through the front holes and a rear metal ring extends through the rear holes to connect the two plates together. A hook extends from the rear metal ring.

8 Claims, 4 Drawing Figures

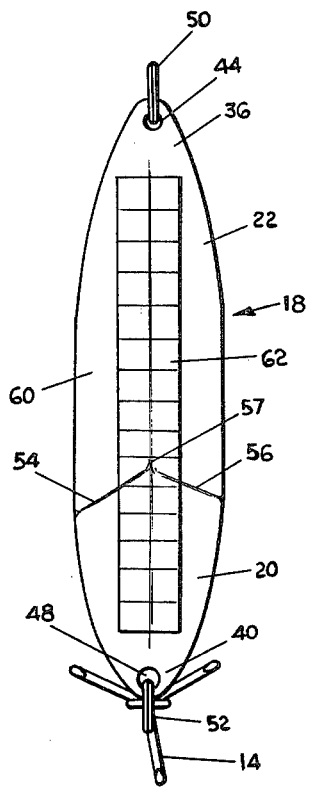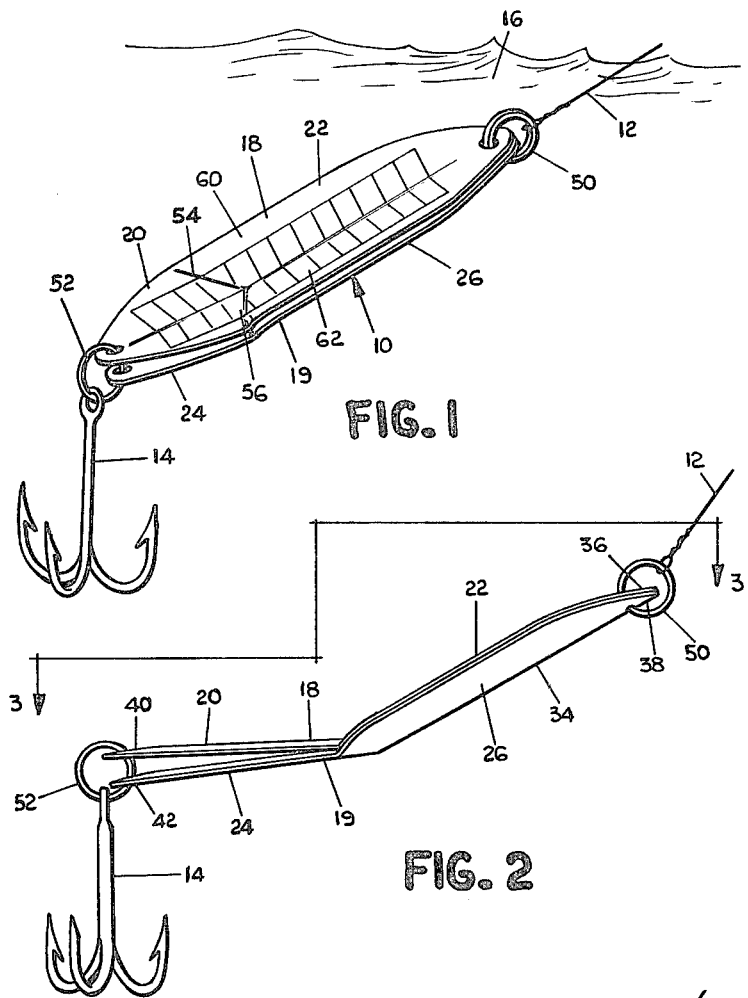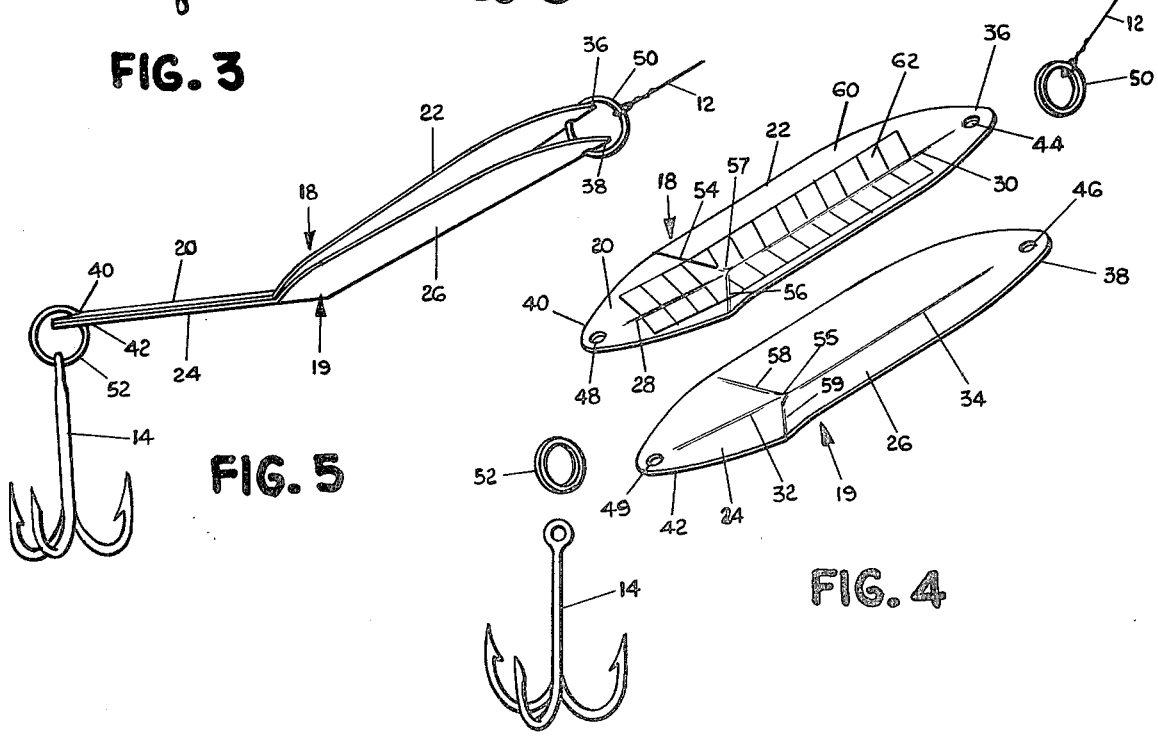

NOISE MAKING LURE

BACKGROUND OF THE INVENTION

1. Field of the Invention

This invention relates to fishing lures and more particularly to fishing lures which produce a noise to attract fish.

2. State of the Prior Art

One of the most important aspects of fishing is to attract fish. Particularly when a hook is employed, the fish must be tempted to seize the hook.

One of the oldest ways to attract fish to the hook is to put live bait on the hook. Artificial bait is also used. Some types of artificial bait are mounted right on the hook. Innumerable lures have been designed to simulate a swimming fish, frog or other edible animal.

In addition to the bait on the hook or lines, other methods are used to attract fish into the general vicinity. One successful method of attracting fish is to create particular noises in the water which attract the fish. Battery operated noise makers have been submerged under water and activated to produce a noise to attract fish. Lures have also been designed to rapidly revolve when drawn through the water to create a whistle-like sound.

U.S. Pat. No. 1,997,802 issued to Meyer on Apr. 15, 1935, discloses a line bearing a head member and two trailing members. When the line is rapidly drawn through the water, the rear portions of the trailing members strike each other to produce a noise. However, the line does not produce noise when slowly drawn through the water.

SUMMARY OF THE INVENTION

According to the invention, a fishing lure has two sonorous bodies connected together such that the bodies rattle against each other when drawn through water. The double bodied fishing lure is connected to a fishing line in the same fashion as a single bodied plate-type lure.

In one embodiment, a double bodied fishing lure has two plates connected together. Preferably, the plates are made from metal. Each plate has a front and rear portion. Each plate has the front portion bent upwardly from the rear portion.

In one embodiment, the two plates are substantially the same size and their front and rear portions have conforming shapes such that the first plate can nest on the second plate.

In one embodiment, the first plate has its front portion bent upwardly a greater degree than the front portion of the second plate.

Desirably, the rear portion has a longitudinal bend whereby the plate extends downwardly therefrom.

In a specific embodiment, the front portion has a longitudinal bend such that the plate upwardly extends therefrom.

It is desirable that each plate has tapered ends. It is also desirable that each plate has at each tapered end a hole therethrough. A first ring extends through the front holes of both plates and a rear ring extends through the rear holes of both plates.

It is desirable that when the back portion of the first plate is nested on the back portion of the second plate, the distance between the front ends of the latter is substantially the diameter of the front ring.

A hook is preferably connected to the back ring.

It is also desirable that the first plate has a surface which reflects light and sparkles. A sparkling tape, adhered to the top surface of the top first plate, can provide a suitable sparkling surface.

BRIEF DESCRIPTION OF THE DRAWINGS

FIG. 1 is a perspective view of an embodiment of a double bodied lure according to the invention;

FIG. 2 is a side elevational view of the lure shown in FIG. 1 with the front portion of the plates in a nesting position;

FIG. 3 is a top plan view of the lure taken along lines 3—3 of FIG. 2;

FIG. 4 is an exploded view of the lure shown in FIG. 1; and

FIG. 5 is a side elevational view of the lure shown in FIG. 1 with the rear portion of the plates in a nesting position.

DETAILED DESCRIPTION OF THE PREFERRED EMBODIMENT

Referring particularly to FIG. 1, a fishing line 12 is attached to a front portion of the double bodied lure 10. A hook 14 is connected to a rear portion of the double bodied lure 10. The hook 14, lure 10, and fishing line 12 are adapted to be submerged in water 16.

As more clearly shown in FIG. 2, the double bodied lure 10 has a top plate 18 and a bottom plate 19.

The top plate 18 has a rear portion 20 and a front portion 22. The front portion 22 is bent upwardly from the rear portion 20.

The bottom plate 19 has a rear portion 24 and a front portion 26. The front portion 26 is bent upwardly from the rear portion 24.

Referring to FIG. 4, the rear portion 20 has a longitudinal bend 28 such that the rear portion 20 extends slightly downwardly therefrom. The front portion 22 has a longitudinal bend 30 wherein the front portion 22 extends upwardly therefrom.

Likewise, the bottom plate 19 has a longitudinal bend 32 in its rear portion 24 such that the rear portion extends slightly downwardly therefrom. The front portion 26 has a longitudinal bend 34 wherein the front portion 26 upwardly extends therefrom.

Front portion 22 of plate 18 extends upwardly from rear portion 20. The bends 54 and 56 between the front 22 and rear 20 are angled with respect to each other to form a V-shaped fold. Likewise, in plate 19, front portion 26 is bent upwardly from rear portion 24 about bends 58 and 59. Bends 58 and 59 are angled with respect to each other to form a V-shaped fold. V-shaped folds in both plates 18 and 19 have their apexes 57 and 55 pointing toward the front of the plates.

Referring back to FIG. 2, the front portion 22 of plate 18 and front portion 26 of plate 19 are shaped so that front portion 22 can nest within front portion 26.

Likewise, rear portion 20 is shaped to nest on rear portion 24. But as seen in FIG. 2, when front portion 22 nests within front portion 26, rear portion 20 is angularly displaced from rear portion 24. Vice versa, as shown in FIG. 5, when rear portion 20 nests on rear portion 24, front portion 22 is angularly displaced from rear portion 26.

Referring to FIGS. 3 and 4, the front ends 36 and 38 of plates 18 and 19 are tapered. Likewise, the rear ends 40 and 42 of plates 18 and 19 are tapered. Apertures 44, 46, 48 and 49 extend through ends 36, 38, 40 and 42 respectively. Ring 50 extends through apertures 44 and 46. Ring 52 extends through apertures 48 and 49. Fishing line 12 is connected to ring 50. Hook 14 is connected to ring 52.

As shown in FIG. 5, when back portion 20 is nested on back portion 24, the two front portions 22 and 26 of plates 18 and 19 have their front ends 36 and 38 spaced apart approximately the diameter of ring 50.

The upper surface 60 of top plate 18 has glistening tape 62 adhered thereto. The glistening tape 62 catches sunlight in the water and reflects it to visually attract fish.

In operation, the lure 10 is attached to the fishing line and submerged in the water. Bait may be placed on hook 14. The fishing line 12 is pulled and the lure 10 is pulled through the water. As the lure 10 is pulled through the water, the two plates 18 and 19, each having a different hydrodynamic configuration, tend to go through the water at different speeds. The two plates 18 and 19, being connected to each other in close proximity, cause turbulence in the water which shakes both plates to rattle with each other. The rattling produces noise in the water which attracts fish in the vicinity.

In this fashion, a lure produces noise as it is pulled through water.

Reasonable variation and modification may be made to the above-described embodiment without departing from the spirit and scope of the invention as defined in the appended claims.

The embodiments of the invention in which an exclusive property or privilege is claimed are defined as follows:

1. A noise making fishing lure comprising first and second sonorous plates mounted on top of each other and connected together loosely at front and rear ends of the plates, the plates being shaped with different surface contours on the surfaces opposing each other such that the flow of water over the lure as it is pulled through the water causes a relative vibration between the plates, the vibration causing the plates to rattle together so as to produce a distinct noise, the plates being formed and positioned such that a protrusion on one plate fits into a recessed portion in the other plate when the plates are connected together.

2. A fishing lure as described in claim 1 wherein the rear and front ends of each plate are tapered.

3. A noise making fishing lure comprising first and second sonorous plates mounted loosely on top of each other, the plates being shaped with different surface contours on the surfaces opposing each other such that the flow of water over the lure as it is pulled through the water causes a relative vibration between the plates, the vibration causing the plates to rattle together so as to produce a distinct noise, each plate having front and rear portions that are disposed at predetermined angles with respect to each other, the angle for each plate being different, with the plate having the sharpest angle between the front and rear portions being on top of the other plate, the plates fitting together at the angular junctions between the front and rear portions of the plates with the respective front and rear portions facing each other, the different angles providing a separation between the front or rear portions of the plates, the plates pivoting relative to each other at the junctions such that the front and rear portions of the plates alternately contact each other and produce said rattling sound as the lure is pulled through the water.

4. A noise making fishing lure according to claim 3 wherein the plates have V-shaped transverse cross-sections and are formed such that the front portions have mating surface contours and the rear portions have mating surface contours when the respective portions are pivoted into contact with each other, the principal difference between the surface contours of the plates being the angular bend between the front and rear portions of the different plates, the V-shaped transverse cross-sectional contours having obtuse inner angles, the front and rear portions of the plates being straight longitudinally and disposed at obtuse angles with respect to each other, the obtuse angles of the V-shaped transverse contours of the front portions of the plates and the obtuse angles between the front and rear portions of the plates all facing away from the same sides of the plates, the obtuse angles of the transverse contours of the rear portions of the plates facing away from the opposite sides of the plates from the other angles.

5. A noise making fishing lure according to claim 3 wherein the plates are interconnected by rings that fit through apertures in both ends of the plates, the difference between the angles between the front and rear portions of the respective plates being such that the front ends of the plates are spaced apart no more than the inner diameter of the ring holding the front ends together when the rear portions of the plates are in contact wth each other, and the rear ends of the plates are spaced apart no more than the inner diameter of the ring holding the rear ends together when the front portions are in contact with each other.

6. A noise making fishing lure according to claim 3 wherein the front portion of each plate is substantially longer than the rear portion of each plate, with the fishing line being connected to the front ends of the plates and a hook being mounted on the rear portions of the plates.

7. A noise making fishing lure comprising a pair of elongated metal plates loosely fastened together one on top of the other, the plates having longitudinally straight front and rear portions disposed at upwardly facing obtuse angles with respect to each other, the obtuse angle of the upper plate being smaller than the obtuse angle of the lower plate, the front portion of each plate having an upwardly facing V-shaped transverse cross-sectional configuration and the rear portion of each plate having a downwardly facing V-shaped transverse configuration, the front portions being longer than the rear portions and both the front and rear portions being tapered inwardly at the ends thereof, the ends of the plates having apertures therein and the plates being fastened together loosely by a ring on each end that fits through the apertures in both plates, the differences in the obtuse angles being such that when the front portions of the plates are in contact with each other, the rear ends of the plates are separated by a distance no greater than the internal diameter of the ring holding the rear ends together, the distance between the front ends of the plates similarly being no greater than the internal diameter of the ring holding the front ends together when the rear portions are in contact with each other, a hook being attached to the ring fastening the rear ends of the plates together and the ring holdng the front ends of the plates together being adapted to be attached to a fishing line, the lure being formed such that the plates rattle together and produce a distinct noise when the lure is pulled through the water.

8. A noise making fishing lure comprising first and second sonorous plates mounted on top of each other and connected together loosely at front and rear ends of the plates, the plates being shaped with different surface contours on the surfaces opposing each other such that the flow of water over the lure as it is pulled through the water causes a relative vibration between the plates, the vibration causing the plates to rattle together so as to produce a distinct noise, the plates being formed and positioned such that the one plate can pivot back and forth on the other plate about a point between the ends of the plates, the opposing surfaces on each side of the pivot point mating when pivoted into engagement with each other.

* * * * *